United States Patent
Smith

(10) Patent No.: US 6,647,112 B2
(45) Date of Patent: Nov. 11, 2003

(54) ONE-NUMBER GLOBAL-SERVICES INTERNATIONAL NUMBERING PLAN

(76) Inventor: Charles L. Smith, 13540 Discovery Dr., Omaha, NE (US) 68137-3020

( * ) Notice: Subject to any disclaimer, the term of this patent is extended or adjusted under 35 U.S.C. 154(b) by 73 days.

(21) Appl. No.: 10/033,238

(22) Filed: Dec. 28, 2001

(65) Prior Publication Data

US 2003/0123632 A1 Jul. 3, 2003

(51) Int. Cl.[7] .............................................. F24Q 8/23
(52) U.S. Cl. .................................................. 379/220.01
(58) Field of Search ....................... 379/220.01; 709/202

(56) References Cited

U.S. PATENT DOCUMENTS 6,069,945 A  *  5/2000  Brown et al. .......... 379/220.01

* cited by examiner

Primary Examiner—Ahmad F. Matar
Assistant Examiner—Thjuan P Knowlin
(74) Attorney, Agent, or Firm—Adam H. Jacobs

(57) ABSTRACT

A method of routing a globally-dialed telephone number to a selected customer number including the steps of selecting a geographic country code having an associated international gateway provider and receiving a telephone call having a dial string including the geographic country code and at least one additional identifier number or set of numbers. The telephone call is routed to the originating international gateway provider where a determination is made to direct the call to a database-containing international gateway. The telephone call is compared to the selected numbers in the database and the correct terminating international gateway provider is determined, the telephone call being translated into an international routing number associated with the correct number. The telephone call is then routed to the terminating international gateway provider determined by the international routing number and the telephone call is connected with the terminating service provider.

7 Claims, 1 Drawing Sheet

ONE-NUMBER GLOBAL-SERVICES INTERNATIONAL NUMBERING PLAN

BACKGROUND OF THE INVENTION

1. Technical Field

The present invention relates to global-services international telephone numbering plans and, more particularly, to a one-number global-services international telephone numbering plan which routes a specific globally-dialed international telephone number which terminates to a selected customer number, the method including the steps of routing via a geographic country code to an associated originating international gateway provider, receiving a telephone call having a dial string including the geographic country code and at least one additional identifier number signifying a selected service type, inserting a pre-assigned carrier identification number into the dial string, routing the telephone call to the associated international gateway servicing the specific geographic country code, determining if the telephone call includes the geographic country code, the additional identifier number and the pre-assigned carrier identification number and if so, querying a database providing comparison information relating incoming telephone numbers and the pre-assigned carrier identification number to selected numbers provided by customers, comparing the dial string of the telephone call to the selected numbers in the database and determining the correct terminating service provider which the dialed number is intended to connect with, translating the dialed number into an international routing number associated with the correct terminating service provider and customer, collecting proper call accounting information to be shared with both the originating and terminating international gateway providers, and routing the dialed number to a terminating international gateway provider where the telephone call is connected with the correct number whereby the dialer of the telephone call is connected with the telephone service number of the company he/she is trying to connect with regardless of the originating location of the telephone call. Further, the customer receiving the call shall receive information, as a part of their terminating telephone number such that they can determine the carrier and country of origin and the associated cost of accepting this call, if any.

2. Description of the Prior Art

It is a fact that the economy of the world continues to become a global one, with country boundaries becoming less and less important than the ability to reach and service customers. The ability to provide a single number globally which could be used to access services from anywhere in the world and billed in a variety of ways is well recognized. For example, for a company such as Microsoft, which has customers all over the world, to provide world-wide customer service is a constant challenge due to the vast number of international and national telephone carriers. The problems of providing such world-wide customer service will only worsen as the world continues to develop the interconnected global economy, hastened by such developments as the Internet, trans-oceanic fibre optic cables and satellite communications. There is therefore a need for a world-wide system of connecting customers to vendors through an easily used dialing method, wherein the customer can contact the vendor regardless of their relative locations.

The majority of international and domestic companies use toll-free numbers, premium rate numbers, or shared-cost numbers (numbers that bill a known "local rate" but the long-distance portion is borne by the company, as in cellular phones) to allow their customers or vendors to contact them either without the customer having to pay for the contact, or the customer paying a set known amount that may or may not be shared by the company. The domestic companies have a distinct advantage over the international companies as toll-free, premium rate and shared-cost numbers within a country's boundaries are relatively easily implemented. As more and more companies turn to the international market to increase sales, however, there is a need for a one-number global services international numbering plan which allows a caller to dial a single number wherever they are to contact the international company at a known rate, be that free and at the international company's cost, shared between the caller and the international company, but known in advance by the caller, or at a premium rate, in exchange for some value-added information or service which is paid for through the existing telephony billing system.

There have been various attempts to provide toll-free international communications systems, such as those found in Chanda, U.S. Pat. No. 5,550,909 and Abdelaal, U.S. Pat. No. 6,052,457. However, each of these systems in the prior art have inherent disadvantages, such as permitting only limited identification of the caller's location and only handling the passing of UIFN call between U.S. carriers when local exchange carriers do not know where to send the call. There is therefore a need for an easily implemented, easily used international toll-free number system which can be used generally anywhere in the world.

Therefore, an object of the present invention is to provide a one-number global services international numbering system.

Another object of the present invention is to provide a one-number global services international numbering system which is easily implemented and easily used regardless of the location of the user of the system.

Another object of the present invention is to provide a one-number global services international numbering system which will allow a caller to contact an international company via its one-number global services number without requiring the dialing of country-specific or location-specific information.

Another object of the present invention is to provide a one-number global services international numbering plan which will allow a caller to contact an international company via its premium-rate number without requiring the dialing of country-specific or location-specific information, and for billing to occur through the callers existing telephone services provider.

Another object of the present invention is to provide a one-number global services international numbering plan which will allow a caller to contact an international company via its shared-cost number without requiring the dialing of country-specific or location-specific information at a local call rate or similar, pre-subscribed or pre-established rate.

Another object of the present invention is to provide a one-number global services international numbering system which will utilize underutilized geographic country codes for providing global phone numbers, while also benefitting those countries having underdeveloped telephone systems.

Another object of the present invention is to provide a one-number global services international numbering system which will provide origination information regarding the caller in order to inform the terminating service provider of the general geographic location of the caller for service-providing services and for proper rating and billing information to be collected and shared among the various carriers and service providers involved in the call establishment and routing.

Another object of the present invention is to provide a one-number global services international numbering plan which will provide billing and settlement information in order for the originating and terminating international gateway service providers to be properly reimbursed for their respective networks utilization and for the customer to be properly billed, in the case of toll free services; or the caller to be properly billed in the case of premium rate services or; both properly billed in the case of shared-cost services, for their respective telephone calls.

Finally, an object of the present invention is to provide a one-number global services international numbering system which is relatively simple to implement and use and is efficient and valuable for use by international companies.

SUMMARY OF THE INVENTION

The present invention provides a method of routing a globally-dialed international telephone number to a selected customer number, the method including the steps of utilizing a geographic country code which will route to the associated originating country's international gateway provider which will receive the telephone call having a dial string including the geographic country code and at least one additional identifier number signifying a selected service type requested by the caller, and having originated from at least one of a local exchange network, a payphone service provider, a mobile provider network or other similar access provider, who inserted their pre-assigned carrier identification number into the dial string. If the dial string contains the foregoing, the telephone call is directed to an international gateway servicing this geographic country code, which includes a database providing comparison information relating incoming telephone numbers to selected international routing numbers provided by the terminating service provider involved. The incoming digit string is then used to retrieve specific data from the database in order to identify the correct originating local exchange network and associated international routing number which denotes, among other things, the geographic location and the originating service provider of the caller and the proper signaling protocols required for the telephone call to be correctly translated and connected to the associated terminating service provider and end customer. The telephone call is then routed to the international gateway of the terminating service provider and the telephone call is connected with the correct number whereby the dialer of the telephone call is connected with the telephone service number of the company he/she is trying to connect with regardless of the originating location of the telephone call.

It is clear that the features of this invention combine to form an easily implemented and used and extremely useful and efficient one-number global services international numbering plan. For example, no matter where in the world a customer or user is, he or she can dial a single number and be connected with the customer service line of the international company, (or selected other service) they are trying to contact and have the call properly billed in a manner agreeable to the terminating service provider and the customer/holder of the number. Furthermore, in the case of toll-free access, because the present invention permits the company to pay for the cost of the incoming call regardless of the origination location, customers worldwide are able to access the resources of the company, thus creating much good will for the company and expanding its marketplace. Finally, because the system of the present invention does not route the designated calls through the underdeveloped telephone system interchange, the present invention can be used with many country's telephone system interchanges without taxing the existing system while simultaneously improving the country's income. It is thus seen that the present invention provides a substantial improvement over the prior art.

DESCRIPTION OF THE PREFERRED EMBODIMENT

Figure 1:
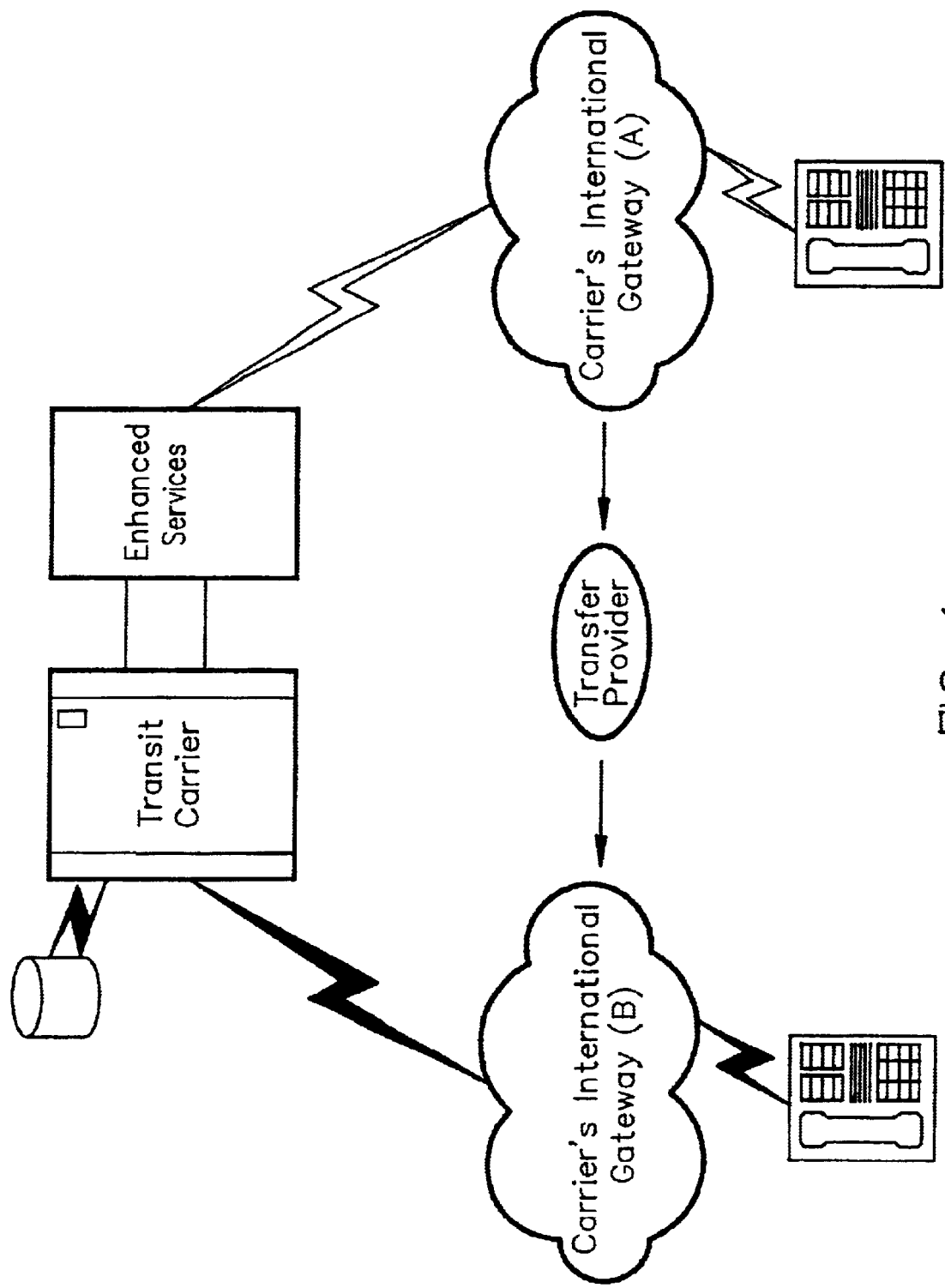
FIG. 1 is a high-level schematic diagram of the routing system of the present invention.

The one-number global services international numbering system 10 of the present invention is best shown in FIG. 1 as including an originating subscriber 12 who initiates a call to an international number designated as the contact number for the end customer 50. In the preferred embodiment, the originating subscriber 12, in contacting the end customer 50, would dial a dial string of numbers which would include a geographic country code of two or three numbers followed by a one, two or three-number identifier string such as "800" to the type of service requested of the end customer (800 signifying toll-free access, for example), followed lastly by a seven or eight digit string unique to the end customer 50. Of course, the specific number of digits used in the identifying string, dial string and other identifier numbers are not critical to the present invention excepting those numbers described as critical herein. In fact, it is quite common that the number of digits will be determined by the terminating service provider 35 at the terminating locations and by related ITU Recommendations.

An important feature of the present invention is that the number being dialed includes a geographic country code, for the following reasons. All geographic country codes have an important attribute when it comes to routing. All calls, regardless of the number dialed, land on the geographic country code's international gateway 20 for routing to their end-point. As each call directed to a particular country passes through that country's international gateway, it is a relatively simple matter to program this international gateway to include a step wherein the incoming call is examined to see if a particular string of numbers or specific identifier numbers are present in the number which has been dialed by the originating subscriber 12. This then allows the geographic country code's international gateway 20 of the present invention to identify and re-direct calls of the "269-NNN" variety to the end customer 50 instead of being terminated to the specific country with which the geographic country code's international gateway 20 is associated.

Obviously, not every country code would work well to implement a series of global products such as those described in connection with the present invention. In fact, very specific attributes are needed, the attributes including that the country code has a very sparsely utilized numbering space, which translates to very low teledensity and very low existing internal traffic and an offshore international gateway (s) where significant call bandwidth is readily available, preferably in continental Europe for ease of access. This also allows for calls to be forwarded to their final destination quickly and relatively inexpensively. It is further preferred that any given country include only one direct interconnect, that being a single connection to the designated geographic country code's international gateway 20, such that all incoming traffic is in fact transmitted through the designated geographic country code's international gateway 20. This way it is ensured that all of the world's telephone connections are routed to the designated geographic country code's international gateway(s) 20 as a central hub. Furthermore, it is important that the country code be severely underused and generally unrecognizable to ensure that users of the system do not confuse the international service being provided with a commonly called country code and also that the country code be routed on a maximum of four digits, so that all switches make routing decisions based on the first digit of the city code within the dial string. It is believed that currently there may be several available country codes which generally fit the above-described attributes, any of which would be acceptable for use with the present invention. For clarity, however, the following description of the operation of the present invention will be done in connection with the geographic country code for the Federal Islamic Republic of Comoros, which uses the country code of "269" although it should be understood that any appropriate country code may be used with the present invention.

In the preferred embodiment, an originating subscriber 12 would dial a number of the format +269-NNN-XXX[X]-XXXX, the call then being fed into the originating subscriber's local exchange network 16, which would ordinarily be a standard local exchange, payphone service provider or a mobile provider network. The local exchange network 16 would insert the proper carrier identification number into the dialed digit string and would then pass the dial string off to the originating international gateway 14 which handles all international calls for the local exchange network 16. The local exchange network may arrange so that the originating international gateway provider inserts the carrier identification number on its behalf. The carrier identification number or "CID" is a number or set of numbers added to the dialed digit string which is unique to each local exchange network 16 and serves as an identifier of this specific network for rating, billing and settlement purposes. It has the added advantage of giving the location from where the call originated to the terminating service provider 35 thus enabling the end customer 50 to use their automated systems to route the call to the proper personnel having, among other things, appropriate language skills or specific geographic responsibility for the location or territory of the caller 12.

When the dial string is received by the originating international gateway 14, the gateway checks the dial string to see if the numbers immediately following the 269 code correspond to the identifier numbers preselected by the terminating service provider 35 which signify that the call is to be redirected to the transit carrier 20, in this case the Comoros Islands geographic country code's international gateway. In the preferred embodiment, the originating international gateway 14 will route all calls of the "269-NNN" format directly on to the designated transit carrier 20, with an important feature being the combination of recognizing and properly charging for those identified calls (for example, not charging the caller at all in the case of toll free identified numbers, or charging a local access fee but not charging for the international long distance portion of a shared-cost call). In this manner, the designated calls of the "269-NNN" variety get forwarded to the particular country's geographic country code international gateway 20, which may be located in Europe (or other highly developed territory(s)) and operated under a transit agreement with the underdeveloped country, then on to the terminating international gateway 30, thus preventing undesirable overloading of the country's internal telephone infrastructure and permitting easier, faster and less expensive routing of calls to the desired location.

In the preferred embodiment, the geographic country code's international gateway 20 will be a second international carrier such as a European or North American international carrier, which will receive the "269-NNN" calls and identify those incoming calls as "269-NNN" calls which are to be translated for further processing by the one-number global services international numbering plan system 10. The translation process of the present invention includes the comparison of the particular "269-NNN" call, and the embodied carrier identification number to a database 22, which includes specific connection information for routing the call to the proper end customer 50 via the correctly identified terminating service provider 35. This is done by translating the "269-NNN" number and the embodied carrier identification number into the unique international routing number, which includes end customer information to permit the call to be connected to the desired end customer 50, the translation being performed within the one-number global services international numbering plan system 10 and being forwarded to the geographic country code's international gateway 20. In the preferred embodiment, the "master" database 22 will be centrally supported and maintained by persons authorized to do so. Occurrences of the database will be deployed at each transit carrier's local switching sites and the data is kept consistent using methods of networking and database replication known in the art of database management. Modifications to the data within the database 22 will be made by standard data modification methods, and would include, but not be limited to, such information as routing information, billing information, and call handling behavior. The database 22 may also be programmed to indicate that specific origination carriers are to be blocked per customer requests or that calls are to be routed differently depending on the location of the caller for various purposes, for example, to support different languages or the like.

Once the geographic country code's international gateway 20 has received the translation of the incoming dial string to the unique international routing number from the database 22, it is forwarded to the end customer's international gateway, referred to herein as the terminating international gateway 30, shown best in FIG. 1. From the terminating international gateway 30, the call is routed via standard routing systems to the terminating service provider 35 and then to the end customer 50. The unique international routing number allows the terminating international gateway 30 to differentiate calls between mobile, pay phone and land line callers, thus resulting in a simple solution to universal availability and eliminating problems associated with proper charging of fees in such situations. The originating subscriber 12 is thus connected to end customer 50 regardless of the originating subscriber's location throughout the world and the charges for the phone call may be simply and properly rated and billed to the subscriber 12 and/or the end customer 50 depending upon the service type utilized, and proper, timely and accurate settlement payments can be calculated and paid by and between all carriers and service providers involved in the carriage of the call thus providing a toll-free, shared-cost or premium rate service for the originating subscriber 12 regardless of origination location.

Several of the benefits of the present invention are that the system that is presently described will not require the implementation of "Intelligent Network" software in the caller's network, potentially including hardware of SS7/C7 design, which is required by other global toll-free telephone systems found in the prior art. Furthermore, as the present invention uses a centralized database, provisioning is done centrally, via on-line interface from each end customer's 50 terminating service provider 35. Therefore, changes are immediate and always contained in a single database 22 thus eliminating "in-country" databases maintained by each originating international gateway 14 and service initiation, termination, country or network blocking, problem reporting and resolution can all be done centrally, at one time, and take effect immediately. In addition, the present invention provides for a simple and accurate rating, billing and settlement process for all international carriers involved in the call processing. Further, the present invention simplifies implementation for additional carriers to participate in the system, by providing a single interconnection point of presence to which a newcomer may attach, yet allows said newcomer to immediately send or receive calls from all existing participants. Finally, and perhaps most importantly the present invention provides a simple, effective and cost-efficient method of providing a single global number to originating subscribers 12 throughout the world allowing them to reach an end customer 50 regardless of their location or the type of phone system they are calling from.

It is to be understood that numerous modifications, additions and substitutions may be made to the one-number global services international numbering plan 10 of the present invention. For example, the precise implementation of the one-number global services international numbering plan 10 of the present invention may be modified or changed so long as the general methodology of providing global one-number communications is maintained. Also, the database formats, the specific international gateways and the particular geographic country codes used in connection with the implementation of the method of the present invention may be different from those described above or may be modified or changed depending upon the particulars of the implementation being carried out. Further, the exact protocol of the signaling path(s) or voice path(s) may change to include such things as voice over Internet protocol ("VoIP") as these technologies evolve and proliferate in the future. Finally, the specific identifier numbers used for the present invention may be modified or changed so long as the intended function of identifying specifically directed calls is maintained.

There has therefore been shown and described a one-number global services international numbering system which accomplishes at least all of its intended objectives.

I claim:

1. A method of routing a globally-dialed telephone number to a selected customer number, said method comprising the steps of:

selecting a geographic country code having an associated international gateway provider;

receiving a telephone call comprising a dial string including said geographic country code and at least one additional identifier number signifying a selected call by at least one of a local exchange carrier network and a mobile provider network;

inserting a preassigned carrier identification number into said dial string, which identifies the specific originating local exchange network or location of the caller;

routing said telephone call to said associated origination international gateway provider;

determining that said telephone call includes said geographic country code, said at least one additional identifier number and said preassigned carrier identification number and directing said telephone call to a second international gateway including a database providing comparison information relating incoming telephone numbers to selected numbers provided by customers;

comparing said dial string of said telephone call to said selected numbers in said database and determining the correct terminating service provider which said telephone call is intended to connect with;

translating said dial string of said telephone call into an international routing number associated with said correct number as determined by said database and determining the correct provider which is responsible for this number;

routing said telephone call to said provider's international gateway; and connecting said telephone call with said correct number whereby a dialer of said telephone call is connected with the telephone service number of the company a dialer is trying to connect with regardless of the originating location of said telephone call; and providing said international carriers and service providers with call detail information whereby said service providers can properly bill the end customer and receive proper settlement payments for access, routing or termination of said telephone call.

2. The method of claim 1 wherein said step of selecting a geographic country code having an associated international gateway provider further comprises selecting a geographic country code which has a low utilized numbering space, therefore having low teledensity and low existing internal traffic and which has an offshore international gateway having significant call bandwidth readily available.

3. The method of claim 1 wherein said step of comparing said telephone call to said selected numbers in said database and determining the correct carrier and international routing number which said telephone call is intended to connect with further comprises deploying copies of said database at each transit carrier's local switching site and the data in said database being kept consistent using methods of networking and database replication.

4. The method of claim 1 wherein said at least one additional identifier number comprises a three digit number in the format "8-X-X" wherein the first number is an eight (8) and the next two numbers are selected from the group comprising 0, 1, 2, 3, 4, 5, 6, 7, 8 and 9.

5. The method of claim 1 wherein said carrier identification number is inserted by the originating local exchange network in order to identify to the terminating international gateway and the end customer the origin network and location of said telephone call.

6. The method of claim 1 wherein said steps of comparing said telephone call to said selected numbers in said database and determining the correct terminating service provider which said telephone call is intended to connect with and translating said telephone call into an international routing number associated with said correct terminating service provider are performed by and within said database such that said transit carrier forwards said telephone call to said terminating service provider with the associated international routing number in response to commands received from said database.

7. A method of routing a globally-dialed telephone number to a selected customer number, said method comprising the steps of:

selecting a geographic country code having an associated international gateway provider;

receiving a telephone call comprising a dial string including said geographic country code and at least one additional identifier number signifying a selected call by at least one of a local exchange carrier network and a mobile provider network;

routing said telephone call to said associated international gateway provider;

determining that said telephone call includes said geographic country code and said at least one additional identifier number and directing said telephone call to at least one international gateway including a database providing comparison information relating incoming telephone numbers to selected numbers provided by customers;

comparing said telephone call to said selected numbers in said database and determining the correct service provider which said telephone call is intended to connect with;

translating said telephone call into an international routing number associated with said correct number;

routing said telephone call to said at least one international gateway provider determined by said international routing number; and connecting said telephone call with said correct number whereby a dialer of said telephone call is connected with the telephone service number of the company a dialer is trying to connect with regardless of the originating location of said telephone call.

* * * * *